May 18, 1937.     C. E. THOMAS     2,080,856
DISPENSING APPARATUS
Filed May 18, 1936
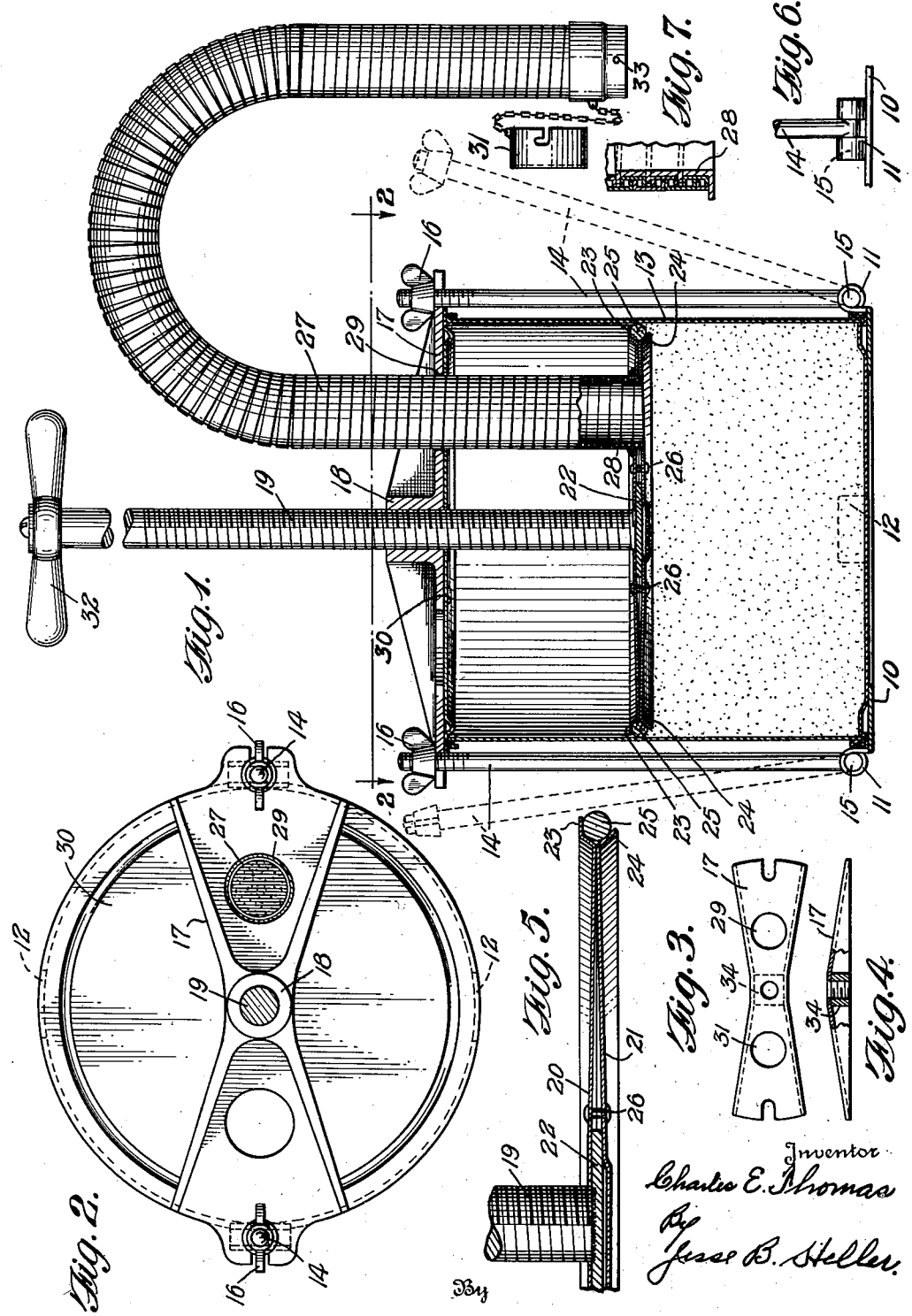

Patented May 18, 1937

2,080,856

UNITED STATES PATENT OFFICE 2,080,856

DISPENSING APPARATUS

Charles E. Thomas, Minooka, Ill., assignor of one-half to Roy C. Gustafson, Chicago, Ill.

Application May 18, 1936, Serial No. 80,456

5 Claims. (Cl. 221—47.5)

This invention relates to dispensing apparatus and more specifically to apparatus for dispensing grease from the original package as received from the distributor.

One of the objects of my invention is to provide a simple and efficient device adapted to be readily clamped to the original can in which the grease was packed and which is arranged to force the grease by pressure means through a delivery tube directly into grease guns, transmissions, differentials, grease cups or any similar place where grease is required.

Another object of my invention is to provide a device of this character in which dust and other foreign matter is excluded from the can above the pressure plunger and thus prevent the accumulation of dirt on the edge of the plunger as it is withdrawn from the can after the can has been emptied.

A still further object of my invention is to provide a plunger which can be formed of sheet metal, which can readily be applied to the pressure applying device or screw.

Referring to the accompanying drawing, in which:—

Fig. 1 is a sectional view of my improved dispenser with a standard grease can in position, with the delivery tube in position for filling a grease receptacle, Fig. 2 is a sectional plan view on the line 2—2 of Fig. 1, Fig. 3 is a plan view of a modified form of cross-bar on a reduced scale, Fig. 4 is a side elevation partially in section of the cross-bar shown in Fig. 3, Fig. 5 is an enlarged sectional view of a portion of the plunger and the ram for actuating the plunger, Fig. 6 is a detail view showing the connection between one of the clamping rods and the base, Fig. 7 is a detail sectional view showing one form of connection between the ram and the grease delivery tube.

In the drawing, the reference character 10 designates a sheet metal base having ears 11 formed by rolling over projecting members extending from the blank from which the base is formed. These ears 11 together with projections 12 extending upwardly from the base between the ears 11, form a centering means for positioning a standard grease can 13 on the base.

14 designates clamp rods, each having laterally extending portions 15 seated within one of the ears 11. The upper ends of the rods are screw threaded and are provided with thumb-nuts 16. These thumb-nuts are arranged to engage the upper surface of a cross-bar 17 having slots in the ends thereof through which the bolts extend.

The cross-bar in Figs. 1 and 2 is provided with a central boss 18 which is screw-threaded for the reception of a threaded ram 19. The lower end of the ram 19 is reduced and extends through an opening in an upper disc 20 and is welded to a disc 22 between the disc 20 and a lower disc 21 riveted to the upper disc 20 by means of rivets 26. The discs 20 and 21 form a plunger between which the disc 22 is arranged to rotate to raise or lower the plunger when the ram 19 is rotated.

The upper disc 20 is flared at its edge as shown at 23, while the lower disc 21 is similarly flared as at 24 to form a groove for the reception of a packing ring 25 which is pressed into contact with the inner wall of the grease can to form a tight joint between the plunger and the can when the plunger is forced against the grease.

A flexible metal delivery tube 27 is secured to the plunger by means of a flanged bushing 28 having a thread on the exterior thereof, which extends through openings in discs 20 and 21 and engages the spirals of the delivery tube in the interior thereof to clamp the end of the tube against the upper face of the lower disc 21.

If desired the end of the flexible tube 27 may be soldered directly to the top of disc 20 of the plunger over the openings through the discs 20 and 21.

The delivery tube 27, extends upwardly from the plunger through an opening 29 in the cross-bar 17, as well as a registering opening in a can cover 30 which is clamped between the top of the can and the cross-bar 17.

Connected to the end of the tube 27 by means of a chain is a cap 31 which is arranged to be secured over the nozzle by means of a bayonet joint comprising an L shaped slot in the cap and a pin 33 on the nozzle.

Secured to the upper end of the ram 19 is a handle 32 for rotating the ram to actuate the plunger.

In Figs. 3 and 4, I have shown a modified form of cross-bar 17 formed of sheet metal in which I have used the same reference characters to designate similar parts, except in this form there is no central threaded boss for the ram, and instead thereof a nut 34 is placed between the side flanges of the cross-bar.

The advantages of my invention result from the provision of a dispensing device in which a number of the parts can be stamped from sheet stock and in which the other parts can be cheaply made so that the device can be sold at such a low figure that farmers and users of grease can afford to purchase the device.

While I have illustrated and specifically described one preferred embodiment of my invention, it will be understood that various changes in the modification may be made therein within the contemplation of the invention and the scope of the following claims.

I claim:

1. A grease dispensing device having a base for the reception of a standard grease can, upwardly extending rods pivotally connected to the base and having threaded upper ends, a cross-bar having openings for the reception of the upper ends of the rods, nuts on the ends of the rods for clamping a standard grease can between the base and the cross-bar, a plunger whose diameter is substantially equal to the inside diameter of a standard grease can, an upwardly extending delivery tube connected to the plunger above an opening through the plunger, there being a guiding opening in the cross-bar through which the delivery tube extends, and a screw-threaded ram extending through a threaded member in the center of the cross-bar for depressing the plunger to force the grease through the delivery tube.

2. A grease dispensing device having a sheet metal base for the reception of a standard grease can, rolled ears on opposite sides of the base beyond the space occupied by the can, upwardly extending rods pivotally mounted in said ears, the upper ends of the rods being screw-threaded, a cross-bar having openings through the ends thereof for the threaded ends of the rods, nuts on the rods for clamping a can between the base and cross-bar, a plunger arranged to be inserted in the can, a screw-threaded ram extending through a threaded opening in the cross-bar for depressing the plunger, said plunger comprising upper and lower discs of a diameter slightly less than the inside diameter of the said standard can, the outer edges of the discs being flared to form a groove between the discs, a pliable packing ring seated in the groove arranged to contact with the can, there being registering openings through the discs, and a delivery tube secured to the upper disc above said openings.

3. A plunger for a grease dispensing device, having upper and lower discs fixedly secured to each other, a disc of smaller diameter between said discs at the center thereof, a ram secured to the smaller disc and extending through an opening in the upper disc, the edge of the upper disc being flared upwardly and outwardly to form a packing ring groove between the discs, there being registering openings through the discs beyond the center of the plunger, and means for securing a delivery tube to the plunger over the last mentioned openings.

4. A grease dispensing device having a sheet metal base for the reception of a standard grease can, rolled ears on opposite sides of the base beyond the space occupied by the can, upwardly extending rods pivotally mounted in said ears, the upper ends of the rods being screw-threaded, a cross-bar having openings through the ends thereof for the threaded ends of the rods, nuts on the rods for clamping a can between the base and cross-bar, a plunger arranged to be inserted in the can, a screw-threaded ram extending through a threaded opening in the cross-bar for depressing the plunger, there being a guide opening in the cross-bar between the opening at one end and the threaded opening for the ram, said plunger comprising upper and lower discs of a diameter slightly less than the inside diameter of the said standard can, the outer edges of the discs being flared to form a groove between the discs, a pliable packing ring seated in the groove arranged to contact with the can, there being registering openings through the discs, and a delivery tube secured to the upper disc above said openings and extending through the opening in the cross-bar.

5. A plunger for a grease dispensing device, having upper and lower discs fixedly secured to each other, a disc of smaller diameter between said discs at the center thereof, a ram welded to the smaller disc and extending through an opening in the upper disc, the edge of the upper disc being flared upwardly and outwardly to form a packing ring groove between the discs, there being registering openings through the discs beyond the center of the plunger, and means for securing a delivery tube to the plunger over the last mentioned openings.

CHARLES E. THOMAS.